(12) United States Patent
Wloka et al.

(10) Patent No.: US 8,701,091 B1
(45) Date of Patent: Apr. 15, 2014

(54) METHOD AND SYSTEM FOR PROVIDING A GENERIC CONSOLE INTERFACE FOR A GRAPHICS APPLICATION

(75) Inventors: Matthias M. Wloka, San Jose, CA (US); Raul Aguaviva, London (GB); Sebastien Julien Domine, San Jose, CA (US); Gregory E. James, Redwood City, CA (US); William Orville Ramey, II, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1555 days.

(21) Appl. No.: 11/304,426

(22) Filed: Dec. 15, 2005

(51) Int. Cl.
*G06F 9/44* (2006.01)

(52) U.S. Cl.
CPC ............ *G06F 9/4443* (2013.01); *G06F 9/4421* (2013.01)
USPC ........................................................ 717/125

(58) Field of Classification Search
CPC ........................................................ G06F 9/44
USPC ................................................. 717/124, 125
See application file for complete search history.

(56) References Cited

U.S. PATENT DOCUMENTS

| | | | | |
|---|---|---|---|---|
| 5,072,412 | A | * | 12/1991 | Henderson et al. ............ 715/804 |
| 5,596,702 | A | * | 1/1997 | Stucka et al. .................. 715/746 |
| 5,643,086 | A | | 7/1997 | Alcorn et al. |
| 5,745,115 | A | * | 4/1998 | Purple et al. ................... 715/810 |
| 5,752,062 | A | | 5/1998 | Gover et al. |
| 5,757,919 | A | | 5/1998 | Herbert et al. |
| 5,815,154 | A | | 9/1998 | Hirschtick et al. |
| 5,892,904 | A | | 4/1999 | Atkinson et al. |
| 5,920,725 | A | | 7/1999 | Ma et al. |
| 5,970,147 | A | | 10/1999 | Davis |
| 5,978,484 | A | | 11/1999 | Apperson et al. |
| 5,999,737 | A | | 12/1999 | Srivastava |
| 6,016,474 | A | | 1/2000 | Kim et al. |
| 6,157,618 | A | | 12/2000 | Boss et al. |
| 6,222,533 | B1 | * | 4/2001 | Notani et al. ................. 715/733 |
| 6,222,537 | B1 | * | 4/2001 | Smith et al. ................... 715/762 |
| 6,266,416 | B1 | | 7/2001 | Sigbjørnsen et al. |
| 6,330,008 | B1 | | 12/2001 | Razdow et al. |
| 6,362,825 | B1 | | 3/2002 | Johnson |
| 6,412,039 | B1 | | 6/2002 | Chang |
| 6,412,106 | B1 | * | 6/2002 | Leask et al. ................... 717/124 |
| 6,501,491 | B1 | * | 12/2002 | Brown et al. ................. 715/853 |
| 6,668,325 | B1 | | 12/2003 | Collberg et al. |
| 6,684,389 | B1 | | 1/2004 | Tanaka et al. |
| 6,732,060 | B1 | | 5/2004 | Lee |
| 6,760,903 | B1 | * | 7/2004 | Morshed et al. .............. 717/130 |

(Continued)

OTHER PUBLICATIONS

Duca et al.; A Relational Debugging Engine for the Graphics Pipeline; International Conference on Computer Graphics and Interactive Techniques; ACM SIGGRAPH 2005; pp. 453-463; ISSN:0730-0301.

(Continued)

*Primary Examiner* — Ted T Vo

(57) ABSTRACT

A method and system for application development. Specifically, a generic console interface is provided that is capable of interacting with graphics applications. The console interface is capable of accessing a graphics application by detouring at least one predefined system call made by the graphics application. User input is intercepted that is related to the predefined system call that is detoured. The user input is communicated through the console interface. An operation is performed as implemented by the user input through a dynamically loadable module.

20 Claims, 4 Drawing Sheets

(56) References Cited

U.S. PATENT DOCUMENTS

| | | | |
|---|---|---|---|
| 6,901,582 B1 | 5/2005 | Harrison | |
| 6,943,800 B2 | 9/2005 | Taylor et al. | |
| 6,957,191 B1* | 10/2005 | Belcsak et al. | 705/38 |
| 6,965,994 B1 | 11/2005 | Brownell et al. | |
| 7,016,972 B2 | 3/2006 | Bertram et al. | |
| 7,047,519 B2 | 5/2006 | Bates et al. | |
| 7,076,740 B2* | 7/2006 | Santori et al. | 715/771 |
| 7,086,006 B2* | 8/2006 | Subramanian et al. | 715/747 |
| 7,095,416 B1 | 8/2006 | Johns et al. | |
| 7,107,484 B2 | 9/2006 | Yamazaki et al. | |
| 7,173,635 B2 | 2/2007 | Amann et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |
| 7,401,116 B1 | 7/2008 | Chalfin et al. | |
| 7,401,242 B2 | 7/2008 | Abernathy et al. | |
| 7,420,563 B2 | 9/2008 | Wakabayashi | |
| 7,505,953 B2 | 3/2009 | Doshi | |
| 7,555,499 B2 | 6/2009 | Shah et al. | |
| 7,765,500 B2 | 7/2010 | Hakura et al. | |
| 7,778,800 B2 | 8/2010 | Aguaviva et al. | |
| 7,891,012 B1 | 2/2011 | Kiel et al. | |
| 2001/0034835 A1 | 10/2001 | Smith | |
| 2001/0044928 A1 | 11/2001 | Akaike et al. | |
| 2002/0157086 A1 | 10/2002 | Lewis et al. | |
| 2002/0175839 A1 | 11/2002 | Frey | |
| 2003/0043022 A1 | 3/2003 | Burgan et al. | |
| 2003/0120935 A1 | 6/2003 | Teal et al. | |
| 2003/0177476 A1* | 9/2003 | Sarma et al. | 717/128 |
| 2003/0214660 A1 | 11/2003 | Plass et al. | |
| 2004/0085894 A1 | 5/2004 | Wang et al. | |
| 2004/0088719 A1* | 5/2004 | Gazdik et al. | 719/330 |
| 2004/0130552 A1 | 7/2004 | Duluk, Jr. et al. | |
| 2004/0158824 A1 | 8/2004 | Gennip et al. | |
| 2004/0162989 A1 | 8/2004 | Kirovski | |
| 2004/0268311 A1* | 12/2004 | Pizzoli et al. | 717/124 |
| 2005/0198051 A1 | 9/2005 | Marr et al. | |
| 2005/0222881 A1 | 10/2005 | Booker | |
| 2005/0243094 A1 | 11/2005 | Patel et al. | |
| 2005/0268288 A1* | 12/2005 | Nattinger | 717/125 |
| 2005/0273652 A1 | 12/2005 | Okawa et al. | |
| 2005/0278684 A1 | 12/2005 | Hamilton et al. | |
| 2006/0047958 A1 | 3/2006 | Morais | |
| 2006/0079333 A1 | 4/2006 | Morrow et al. | |
| 2006/0080625 A1 | 4/2006 | Bose et al. | |
| 2006/0109846 A1 | 5/2006 | Lioy et al. | |
| 2006/0161761 A1 | 7/2006 | Schwartz et al. | |
| 2006/0185017 A1 | 8/2006 | Challener et al. | |
| 2007/0115292 A1 | 5/2007 | Brothers et al. | |
| 2007/0274284 A1 | 11/2007 | Dendukuri et al. | |
| 2008/0007563 A1 | 1/2008 | Aronson et al. | |
| 2008/0095090 A1 | 4/2008 | Lee et al. | |

OTHER PUBLICATIONS

"maxVUE Graphic Editor", Metso Automation, 2005, pp. 1-6, http://www.metsoautomation.com/automation/indes.nsf/FR?Readform&ATL=autom- ation/ed.sub.--prod.nsf/WebWID/WTB-041110-22256F-2445A; eHB.

"Ati Radeon X800, 3D Architecture White Paper", ATI, 2005, pp. 1-13, with proof of seniority (4pages), according to ACM bibliography regarding the document: "The Direct3D 10 system", ACM TOG, vol. 25, Iss.3 (Jul. 2006), Reference 1; eHG.

N. Tatarchuk, "New RenderMonkey Features for DirectX and OpenGL Shader Development", Game Developers Conference, Mar. 2004.

C. Cebenoyan and M. Wloka, "optimizing the graphics pipeline", 2003, Nvidia GDC Presentation Slide.

gDEBugger, graphicREMEDY, http://www.gremedy.com/, Jul. 29, 2005.

gDEBugger, graphicRemedy, http://www.gremedy.com, Aug. 8, 2006.

Josh Lessard, "Profiling Concurrent Programs Using Hardware Counters", May 2005, University of Waterloo, Thesis.

Dror G. Feitelson and Larry Rudolph, "Toward Convergence in Job Scheduling for Parallel Supercomputers", Aug. 1996, Springer, Job Scheduling Strategies for Parallel Processing: IPPS '96 Workshop Hololulu, Hawaii, Apr. 16, 1996 Proceedings.

Jeffrey K. Hollingsworth and Barton P. Miller, "Dynamic Control of Performance Monitoring on Large Scale Parallel Systems", Jul. 23, 1993, ACM, International Conference on Supercomputing: Proceedings of the 7th International Conference on Supercomputing, pp. 185-194.

* cited by examiner

US 8,701,091 B1

METHOD AND SYSTEM FOR PROVIDING A GENERIC CONSOLE INTERFACE FOR A GRAPHICS APPLICATION

FIELD OF THE INVENTION

Embodiments of the present invention relate to performance and debugging analysis of graphics applications. More specifically, embodiments of the present invention relate to a generic console interface capable of accessing a graphics application that is implementable on a modular platform that provides varying functionality through a plurality of dynamically loadable modules.

BACKGROUND ART

Most current graphics applications employ some form of a console interface. The console interface typically provides debugging and performance analysis of the graphics application. For instance, the console interface can be used for loading a new map in a gaming environment, loading a new level, displaying diagnostic information, etc. Typically, the console interface is tightly integrated with the corresponding graphics application. That is, the console interface is unique to the graphics application and provides a window into the internal operations of the graphics application.

However, because of the tight integration between the console interface and the corresponding graphics application, implementation and development of these console interfaces is limited. Usually, the console interface functions are provided as an afterthought. This is because graphics application developers do not have the time to develop a sophisticated console interface due to time and budget constraints.

In addition, because the console interface is integrated tightly with the graphics application code, it becomes difficult to extend the functionality of the console interface for that particular graphics application. Moreover, porting the functionality of a particular console interface from one graphics application to another is difficult because of the tight integration to a particular graphics application.

Also, console interfaces are typically proprietary to the application developer. As a result, console interface functions that are developed for one graphics application may not be licensable to other graphics applications, thereby limiting its use throughout the graphics application community.

As a result, graphics application developers are unable to efficiently improve the overall performance of their graphics application since the console interfaces are limited in their scope and functionality due to time and budget constraints.

SUMMARY OF THE INVENTION

Accordingly, the present invention provides, in various embodiments, a method and system for application development, wherein a generic console interface is provided that is capable of interacting with various graphics applications. The console interface is extensible, open, and sharable using function call interceptions to access the graphics application. Specifically, embodiments of the present invention provide a modular platform for a console interface to a graphics application that provides varying functionality through a plurality of dynamically loadable modules. Additionally, embodiments of the present invention provide for an open and extensible console interface in which various functions can be developed by third parties.

Specifically, in one embodiment, a method is disclosed for application development. In the method, a generic console interface is provided that is capable of interacting with various graphics application. The console interface is capable of accessing a graphics application by detouring at least one predefined system call made by the graphics application. Additionally, user input is intercepted that is related to the predefined system call that is detoured. The user input is communicated through the console interface. An operation is performed as implemented by the user input through a dynamically loadable module.

In another embodiment, a console interface is disclosed that is capable of providing a generic console interface that is extensible, open, and sharable using system calls interceptions to access the underlying graphics application. The console interface is implemented through a wrapper that surrounds the graphics application and includes a detour module for detouring predefined system calls made by the graphics application. The wrapper provides access to the graphics application. A basic interface is provided for providing a communication avenue for user input. A function call module provides for additional functionality to be provided to the console interface through the use of dynamically loadable modules. The console interface includes an open application program interface that allows third parties to create dynamically loadable modules implementable by the console interface.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
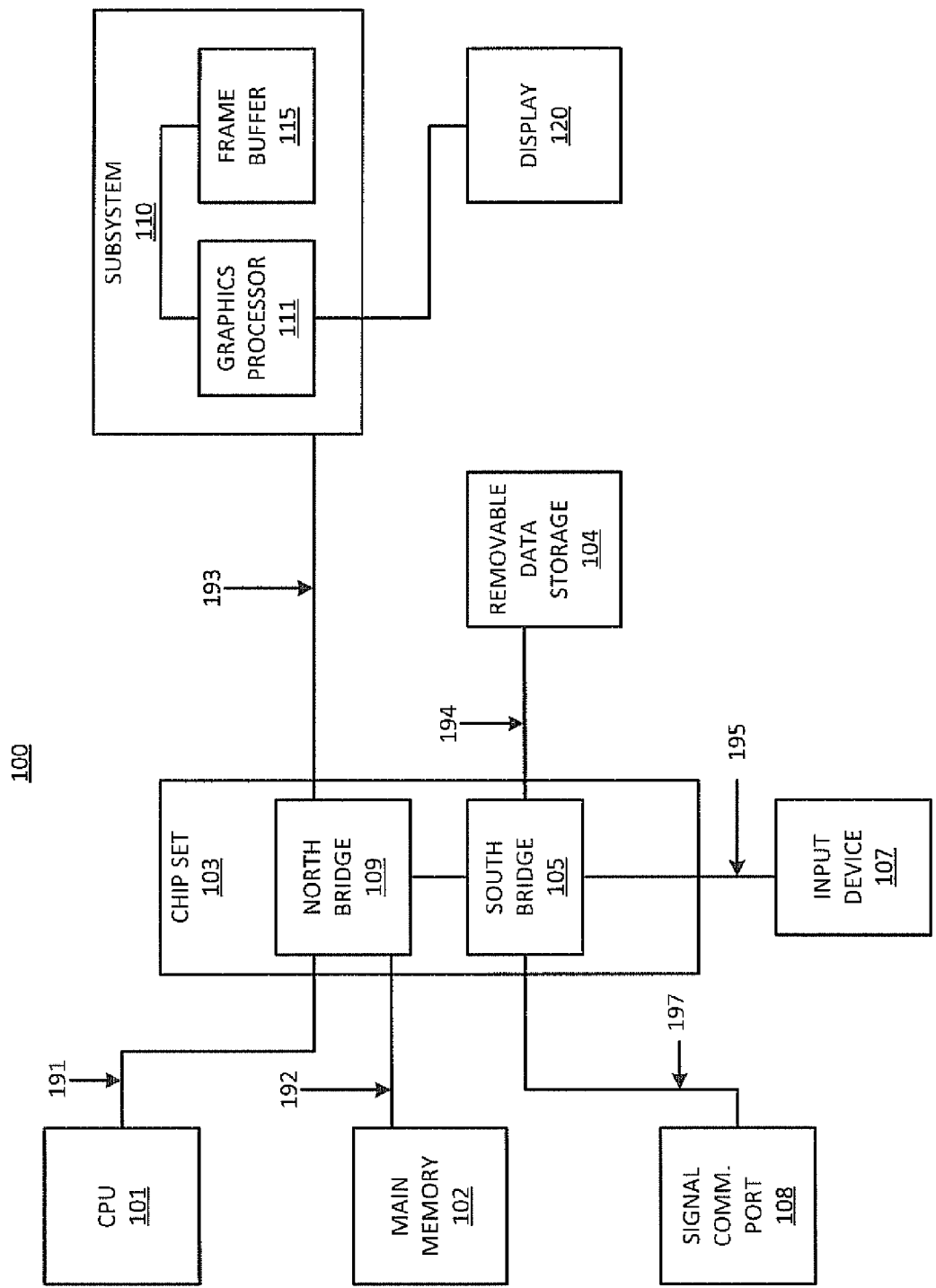
FIG. 1 is a block diagram of a computer system platform that is capable of implementing a generic console interface that is extensible, open, and sharable using function call interceptions to access any graphics application, in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "determining," or "addressing," or "mapping," or "processing," or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

With reference now to FIG. 1, a block diagram of an exemplary computer system 100 is shown upon which embodiments of the present invention can be implemented, in accordance with one embodiment of the present invention. The computer system 100 is capable of implementing a generic console interface that is extensible, open, and sharable using function call interceptions to access any graphics application. Computer system 100 includes central processor unit 101, main memory 102 (e.g., random access memory), chip set 103 with north bridge 109 and south bridge 105, removable data storage device 104, input device 107, signal communications port 108, and graphics subsystem 110 which is coupled to display 120.

Computer system 100 includes several buses for communicatively coupling the components of computer system 100. Communication bus 191 (e.g., a front side bus) couples north bridge 109 of chipset 103 to central processor unit 101. Communication bus 193 couples north bridge of chipset 103 to video or graphics subsystem 110. Communication buses 194-197 (e.g., PCI bus) couple south bridge 105 of chip set 103 to removable data storage device 104, input device 107, signal communications port 108, respectively. In addition, the main memory 102 is coupled to the north bridge 109 via a point to point connection 192 between the memory controller on the north bridge 109 and the dynamic random access memory (DRAM).

The components of computer system 100 cooperatively operate to provide versatile functionality and performance. The operating characteristics of functional components included in computer system 100 can change dynamically. In one exemplary implementation, the components of computer system 100 cooperatively operate to provide predetermined types of functionality, even though some of the functional components included in computer system 100 may be defective. Communications bus 191, 193, 194, 195 and 197 communicate information. Central processor 101 processes information. Main memory 102 stores information and instructions for the central processor 101. Removable data storage device 104 also stores information and instructions (e.g., functioning as a large information reservoir). Input device 107 provides a mechanism for inputting information and/or for pointing to or highlighting information on display 120. Signal communication port 108 provides a communication interface to exterior devices (e.g., an interface with a network). Display device 120 displays information in accordance with data stored in frame buffer 115. Video or graphics processor 111 processes video or graphics commands from central processor 101 and provides the resulting data to frame buffers 115 for storage and retrieval by display monitor 120.

The operational configurations of the functional components included in computer system 100 are flexibly adaptable to meet a variety of objectives. For example, operational configurations of the functional components included in computer system 100 are configurable to maintain execution of a type of function even if some of the functional components are disabled. In one exemplary implementation, central processor 101 and graphics processor 111 are still capable of executing the same type of processing functions and main memory 102 stores information even though some of the functional components (e.g., floating point component, pixel shader component, memory cell component, etc) are disabled. In one embodiment, the processors include a plurality of functional components for performing processing operations. The operational characteristics of the functional components can be altered. In one embodiment, the processors include a plurality of functional components for performing processing operations, wherein defective functional components included in the plurality of functional components are disabled. The processors also include a workflow control component for dispensing workflow to enabled processing components and preventing distribution of workflow to the disabled defective components. In one exemplary implementation, computer system 100 can continue to provide full functionality even though the functionality may be provided at a reduced performance level (e.g., slower).

Figure 2:
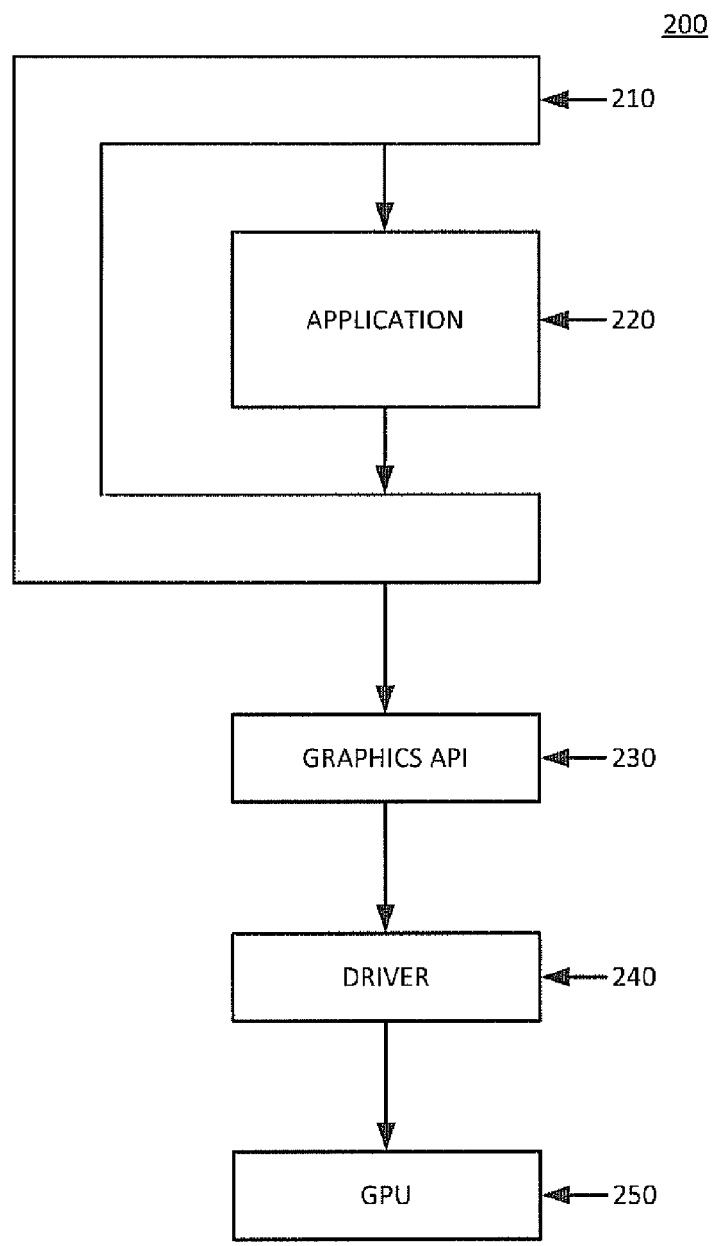
FIG. 2 is a block diagram of a system in which embodiments of the present invention can be implemented, in accordance with one embodiment of the present invention.

Method and System for Providing a Generic Console Interface for a Graphics Application:

FIG. 2 is a block diagram of a system 200 that is capable of providing a generic console interface that is extensible, open, and sharable using system call interceptions to access a graphics application, in accordance with one embodiment of the present invention. Specifically, the present embodiment implements a console interface platform through a plurality of dynamically loadable modules, each providing functionality to the console interface. As such, each console interface can uniquely interface with a corresponding graphics application by selecting the appropriate dynamically loadable modules. Information from the console interface is displayed directly over the graphics application.

As shown in FIG. 2, the system 200 includes a graphics application 220. The graphics application uses a graphics processor to render, or draw, graphic primitive, e.g., a triangle or rectangle, on a display to produce desired visual images. Real time graphics processing requires high speed processing of graphic primitives to produce visually pleasing moving images. In one embodiment, the rendering of three-dimensional graphical images is of interest in a variety of electronic games, television video display and other applications. Rendering is the general term that describes the overall multi-step process of transitioning from a database representation of a three-dimensional object to a two-dimensional projection of the object onto a viewing surface, e.g., computer display, television set.

Also shown in FIG. 2 is a wrapper 210. The wrapper 210 is wrapped around the graphics application 220 to intercept commands, instructions, etc. going into and out of the graphics application 220. The wrapper 210 includes the functionality to implement a generic console interface that is capable of the accessing any graphics application, including the graphics application 220, as will be more fully described below in FIG. 3.

More particularly, the wrapper 210 uses a detours library to detour a number of system calls made to and from the graphics application 220, in accordance with one embodiment. For instance, the wrapper intercepts keyboard handlers and graphics application program interface (API) calls. As such, the present embodiment is able to intercept system calls made by the graphics application 220 and performs operations within the graphics application as provided for in the console interface. Additionally, the wrapper 210 adds functionality to interact with the user and over resulting information over the existing graphics application 220, as will be described in FIG. 3 below.

System calls by the graphics application 220 are filtered through the wrapper 210 and are passed down to the graphics pipeline for further processing. The graphics pipeline of FIG. 2 includes the graphics API 230, the driver 240, and the hardware implementing the graphics pipeline.

The traditional graphics pipeline architecture is typically optimized for high-speed rending operations (e.g., texturing, lighting, shading, etc.) using a widely implemented graphics programming APIs, such as, for example, the OpenGL™ graphics language, Direct3D™, and the like. The graphics API 230 implements the graphics programming API utilized by the graphics application 220.

Additionally, a software driver 240 is provided to provide an interface between the graphics API 230 and the graphics processing unit (GPU) hardware 250. The driver 240 provides the software implementation to create the images displayed on the monitor, for example.

The GPU hardware 250 includes the multi-stage, functional units of the graphics pipeline architecture to implement fast, high quality rendering of complex scenes. The functional units operate in parallel, and can be viewed as separate special purpose processors. For brevity and clarity, a full discussion of the graphics pipeline is not provided, but it is understood that embodiments of the present invention are capable of providing a console interface for use with graphics applications that render images through a graphics pipeline.

The functional units in the GPU hardware 250 are specialized integrated circuit devices that are commonly used in graphics systems to accelerate the performance of a 3-D rendering application, as an example. The GPU hardware 250 is commonly used in conjunction with a central processing unit (CPU) to generate three-dimensional images for one or more applications executing on a computer system. The GPU hardware 250 encompasses the graphics pipeline for processing data. Functional components listed below in part for the GPU hardware 250 include vertex and index fetching, vertex shading (transform and lighting), pixel shading, texture loading, raster operations (ROP), etc.

Figure 3:
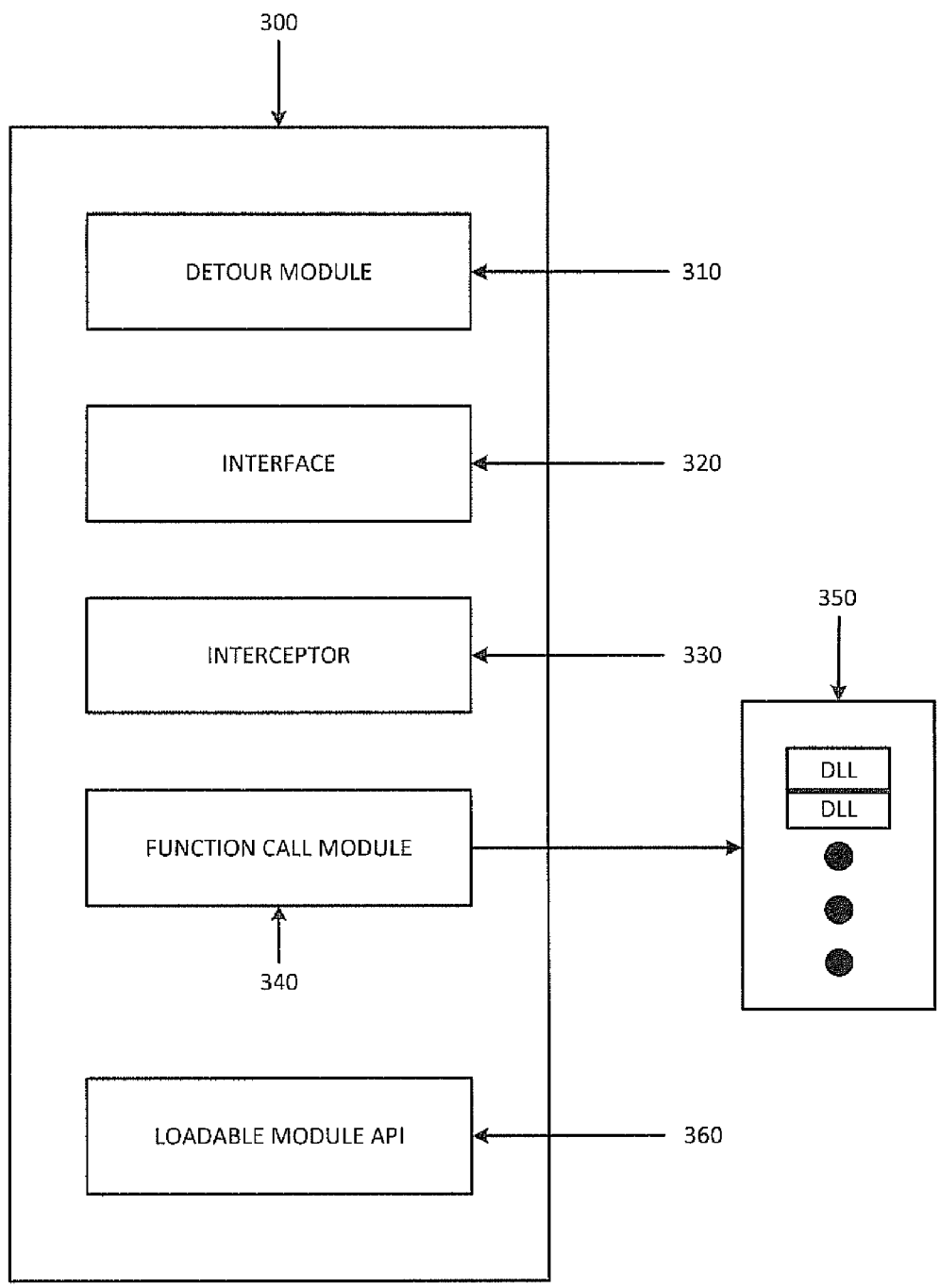
FIG. 3 is a block diagram illustrating a wrapper that is capable of implementing a generic console interface to access any graphics application, in accordance with one embodiment of the present invention.

FIG. 3 is a block diagram of the console interface 300 that is capable of providing a generic console interface that is extensible, open, and sharable using system calls interceptions to access the underlying graphics application, in accordance with one embodiment of the present invention. In one embodiment, the console interface 300 provides additional functionality to the wrapper 210 of FIG. 2.

The console interface 300 includes a detour module 310 that detours system calls made by a graphics application to provide access to the graphics application. For brevity and clarity of understanding a brief discussion of the operations of the detour module 310 is provided below. The detours module 310 is a library capable of intercepting arbitrary, and predefined functions on a computer system.

In addition, embodiments of the present invention provide for a generic interface 320 that is capable of accessing the graphics application by detouring the predefined system calls made by the graphics application. That is, the present embodiment is capable of gathering information regarding the operation of the graphics application through the system 300. In one embodiment, the interface 320 is displayed over the graphics application.

In one embodiment, the interface 320 includes the core functionality of the console interface. Specifically, the core functionality includes closed DLLs that implemented the core functions of the console interface. For instance, some core functions are listed below, but are not intended to be exhaustive: snoop key-presses for enabling the console interface; echo and parse typed keystrokes for commands for the console interface; a help system; loading and unloading of DLLs functionality; an API that allows third parties to create new DLLs that are implementable by the system 300. In essence, the core functionality includes loading and unloading of DLLs, forwarding user input as appropriate, parse and understand commands (e.g., help, list DLLs, etc.). Additional functionalities include performance utilization and debug operations.

In one embodiment, the interface 320 is capable of communicating with any graphics application. That is, the interface 320 through the wrapper functionality of the system 300 is able to access any graphics application through the intercepted system calls. As such, the interface 320 provides for core functionality of a console interface for interacting with the underlying graphics application.

The console interface 300 also includes an interceptor 330 for intercepting user input related to the predefined system call that is detoured. In one embodiment, the interceptor 330 is a command line interface for accepting instructions from a user to be implemented by the console interface 300. The interceptor 330 is able to parse and understand commands issued for example through the command line interface, such as loading and unloading of a DLL.

The interceptor 330 provides for the intercepting and forwarding of user input as appropriate. The interceptor provides the communication means for a user to interface with the console interface 300.

As shown in FIG. 3, the console interface 300 also includes a function call module 340. The function call module 340 performs pre-call, system call, and post-call operations to provide additional selectable functionality to the console interface through detour functions. The detour functions are implemented through a plurality of dynamically loadable modules 350, or plug-ins, also known as dynamically loadable libraries (DLLs). Each of the DLLs provide for separate functionality as provided by user instruction or as dictated by pre-call and post-call functionality implemented by the detour module 310. That is, the DLL performs a detour operation, as implemented by the user input, in one embodiment. In that way, the function call module 340 is able to replace the instructions provided in the original system call with one or more detour functions. As such, embodiments of the present invention are capable of extending the functionality of the console interface by providing additional DLLs implementable by the console interface 300.

In one embodiment, the function call module includes a pre-call function module for calling all pre-call functions related to the predefined system call that is detoured. That is, before the predefined system call is performed, the console interface 300 implements all related pre-call functions. In one embodiment, the function call module 340 calls all pre-calls defined in all the third-party loaded DLLs (e.g., in load order).

In another embodiment, the function call module includes a post-call function module for calling all post-call functions related to the predefined system call that is detoured. That is, after the predefined system call is performed, for example, the console interface calls all post-calls for the API function defines in all third-party loaded DLLs (e.g., in reverse order).

In addition, the function call module is able to call the system call (e.g., graphics API call) depending on what is dictated by the pre-call operations. That is, the pre-call operations may dictate that the console interface 300 skip the predefined system call that is detoured. In that case, only the pre and post-call operations are performed.

As shown in FIG. 3, the console interface 300 also includes the loadable module API 360. The loadable module API 360 provides an open, application program interface 360 for creating additional functional DLLs in the plurality of DLLs 350. That is, the loadable module API 360 defines additional loadable modules that each extend functionality for the console interface 300.

Figure 4:
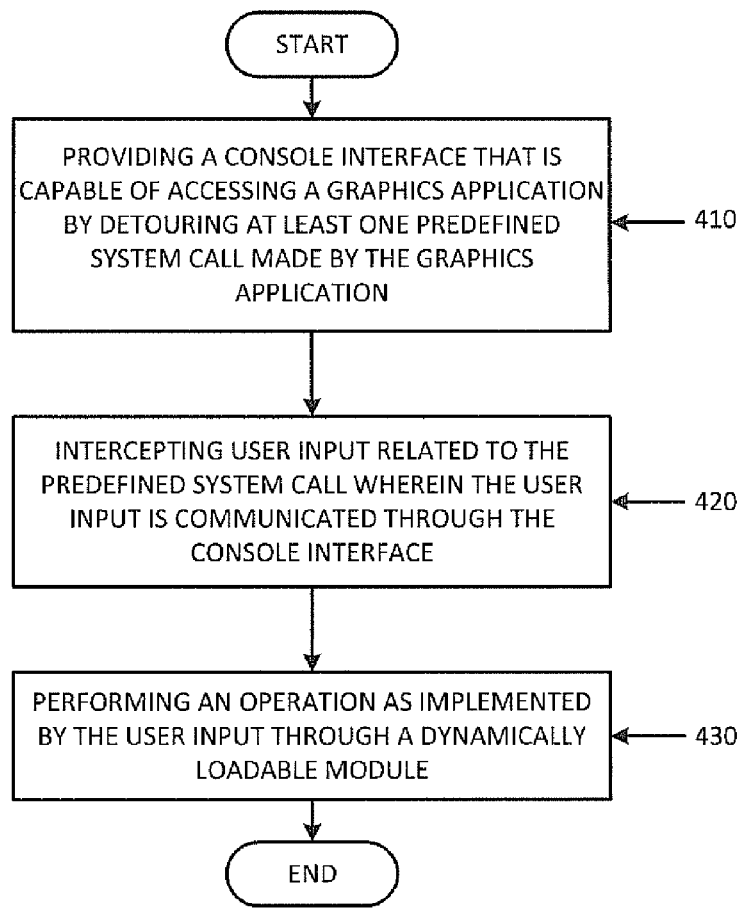
FIG. 4 is a flow chart illustrating steps in a computer implemented method for implementing a generic console interface that is extensible, open, and sharable using function call interceptions for accessing any graphics application, in accordance with one embodiment of the present invention.

FIG. 4 is a flow chart illustrating steps in a computer implemented method for providing a generic console interface that is open, extensible, and sharable using system call interceptions to access the underlying graphics application, in accordance with one embodiment of the present invention. The embodiment of FIG. 4 provides for a method of extending the functionality of a generic console interface to perform various operations related to debugging, visualization, profiling, etc., such as performance utilization; debug; overlay heartbeat graphs depicting relevant performance measurements; overlay information showing consumption of graphics API or game resources (e.g., texture memory, etc.); overlay relevant game statistics (e.g., frames per second); display warnings (e.g., debug runtime warnings; abuse of various APIs, etc.); allow stepping through of draw calls in a frame to visualize drawing order; visualize depth complexity, shader complexity, or other performance critical measures; visualize current GPU state for a given draw call; visualize overall performance bottleneck per frame or open draw call, etc.

At 410, the present embodiment provides a console interface that is capable of accessing a graphics application by detouring at least one predefined system call made by the graphics application. This is accomplished by wrapping the graphics application with the console interface, such that all instructions, calls, etc. going into or out of the graphics application is intercepted by the console interface. In this way, the console interface is able to access the graphics application by performing additional, detour functionality in place of the calls that were intercepted.

In one embodiment, the present embodiment performs pre and post functions for graphics calls. For instance, the present embodiment intercepts the predefined system call. Thereafter, the present embodiment performs pre-call operations by calling all pre-calls defined in third party DLLs in load order.

The present embodiment then makes the graphics API call, or skips the graphics API call if the pre-call functionality sets skip conditions). Afterwards, the present embodiment calls all post-calls for the graphics API call that are defined in the user-loadable DLLs, in reverse load order.

In one embodiment, the console interface is displayed over the graphics application in a heads up display (HUD) format. That is, the information requested by the user through the console interface is dynamically displayed on the console interface over the graphics application.

At 420, the present embodiment intercepts user input related to the predefined system call that is detoured. The user input is communicated through the console interface. As such, the present embodiment provides for the user to provide additional input as to the operations being performed as a result of intercepting the predefined system call that is detoured.

At 430, the present embodiment performs an operation as implemented by the user input through a corresponding dynamically loadable module. As such, the present embodiment is able to extend the functionality of the console interface through the use of varying dynamically loadable modules.

In one embodiment, the dynamically loadable modules are created through an open API that defines additional and extensible functionality for the console interface. These dynamically loadable modules can be created by third parties that create new and extendable features to the console interface that can be implementable on any graphics application.

In addition to defining a number of pre and post detour calls, the created DLLs also expose their available functionality, in accordance with one embodiment of the present invention. For instance, each DLL exports the name, syntax, and help information of their corresponding commands, so that the console interface's parser and help system can fully integrate these third party DLLs into the workflow.

In addition, another embodiment of the present invention provides a mechanism by which application developers are capable of communicating application dependent information. For example, various debug-visualization techniques find it useful to alter the current camera position (e.g., to visualize the current view frustum from another viewpoint). As such, the present embodiment can make "SetInfo( )" and "GetInfo( )" calls to track application specific information.

Accordingly, the present invention provides, in various embodiments, a method and system for application development, wherein a generic console interface is provided that is capable of interacting with various graphics applications. The console interface is extensible, open, and sharable using function call interceptions to access the graphics application. Specifically, embodiments of the present invention provide a modular platform for a console interface to a graphics application that provides varying functionality through a plurality of dynamically loadable modules. Additionally, embodiments of the present invention provide for an open and extensible console interface in which various functions can be developed by third parties.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method of application development, comprising:
providing a console interface that is capable of accessing a graphics application by detouring at least one predefined system call made by said graphics application, wherein said console interface is operable for use in debugging said graphics application;
intercepting user input related to a predefined system call that is detoured, wherein said user input is communicated through said console interface; and
performing an operation as implemented by said user input through a dynamically loadable module.

2. The method of claim 1, further comprising:
providing an open application program interface for defining additional loadable modules that each extend functionality for said console interface.

3. The method of claim 1, further comprising:
displaying results of said operation in said console interface.

4. The method of claim 1, further comprising:
displaying said console interface over said graphics application.

5. The method of claim 1, wherein said providing a console interface further comprises:
detouring said at least one predefined system call made by said graphics application to provide access to said graphics application.

6. The method of claim 5, further comprising:
intercepting said predefined system call;
calling all pre-call functions related to said predefined system call that is detoured;
calling said predefined system call that is detoured as allowed by said pre-call functions; and
implementing all post-call functions related to said predefined system call that is detoured.

7. The method of claim 1, further comprising:
loading said dynamically loadable module to perform said operation; and
unloading said dynamically loadable module after performing said operation.

8. A console interface, comprising:
a detour module for detouring system calls made by a graphics application to provide access to said graphics application;
an interface that is capable of accessing said graphics application through said detour module by detouring at least one predefined system call made by said graphics application, wherein said interface is displayed over said graphics application, and wherein said interface is operable for use in debugging said graphics application;
an interceptor for intercepting user input related to said predefined system call that is detoured; and
a dynamically loadable module for performing an operation as implemented by said user input.

9. The console interface of claim 8, further comprising:
an open application program interface for defining additional loadable modules each extending functionality for said console interface.

10. The console interface of claim 8, further comprising:
a pre-call function module for calling all pre-call functions related to said predefined system call that is detoured;
a call function module for calling said system call that is detoured as allowed by said pre-call functions; and
a post-call function module for calling all post-call functions related to said predefined system call that is detoured.

11. The console interface of claim 8, further comprising:
a loader for loading said dynamically loadable module for performing said operation; and
an unloader for unloading said dynamically loadable module after performing said operation.

12. The console interface of claim 8, further comprising:
a command line interface for intercepting said user input.

13. A computer system comprising:
a processor for processing information; and
a computer readable memory coupled to said processor and containing program instructions that, when executed cause said processor to implement a method of application development, comprising:
providing a console interface that is capable of accessing a graphics application by detouring at least one predefined system call made by said graphics application, wherein said console interface is operable for use in debugging said graphics application;
intercepting user input related to a predefined system call that is detoured, wherein said user input is communicated through said console interface; and
performing an operation as implemented by said user input through a dynamically loadable module.

14. The computer system of claim 13, wherein said method in said computer readable memory contains further program instructions that further comprises:
providing an open application program interface for defining additional loadable modules that each extend functionality for said console interface.

15. The computer system of claim 13, wherein said method in said computer readable memory contains further program instructions that further comprises:
displaying results of said operation in said console interface.

16. The computer system of claim 13, wherein said method in said computer readable memory contains further program instructions that further comprises:
displaying said console interface over said graphics application.

17. The computer system of claim 13, wherein said program instructions for providing a console interface in said computer readable memory contains further program instructions that further comprises:
detouring said at least one predefined system call made by said graphics application to provide access to said graphics application.

18. The computer system of claim 17, wherein said method in said computer readable memory contains further program instructions that further comprises:
intercepting said predefined system call that is detoured;
calling all pre-call functions related to said predefined system call that is detoured;
calling said predefined system call that is detoured as allowed by said pre-call functions; and
implementing all post-call functions related to said predefined system call that is detoured.

19. The computer system of claim 13, wherein said method in said computer readable memory contains further program instructions that further comprises:
loading said dynamically loadable module to perform said operation; and
unloading said dynamically loadable module after performing said operation.

20. The computer system of claim 13, wherein said program instructions for intercepting user input in said computer readable memory contains further program instructions that comprises:
 intercepting said user input through a command line interface.

\* \* \* \* \*